(12) United States Patent
Zimmermann et al.

(10) Patent No.: US 10,465,769 B2
(45) Date of Patent: Nov. 5, 2019

(54) TRANSMISSION AND TRANSMISSION TURBOMACHINE

(71) Applicant: VOITH PATENT GMBH, Heidenheim (DE)

(72) Inventors: Arne Zimmermann, Immenstadt (DE); Joachim Rasch, Oberstaufen (DE); Sabine Germann, Burgberg (DE)

(73) Assignee: Voith Patent GmbH, Heidenheim (DE)

(*) Notice: Subject to any disclaimer, the term of this patent is extended or adjusted under 35 U.S.C. 154(b) by 298 days.

(21) Appl. No.: 15/528,683

(22) PCT Filed: Nov. 20, 2015

(86) PCT No.: PCT/EP2015/077182
§ 371 (c)(1),
(2) Date: May 22, 2017

(87) PCT Pub. No.: WO2016/079281
PCT Pub. Date: May 26, 2016

(65) Prior Publication Data
US 2017/0276215 A1    Sep. 28, 2017

(30) Foreign Application Priority Data

Nov. 21, 2014  (DE) .................. 10 2014 223 808

(51) Int. Cl.
*F16H 1/22* (2006.01)
*F16H 57/021* (2012.01)
(Continued)

(52) U.S. Cl.
CPC .............. *F16H 1/22* (2013.01); *F01D 15/12* (2013.01); *F04D 25/02* (2013.01); *F04D 25/163* (2013.01);
(Continued)

(58) Field of Classification Search
CPC ......... F16H 1/22; F16H 57/021; F16H 57/023
(Continued)

(56) References Cited

U.S. PATENT DOCUMENTS 1,862,512 A    6/1932  Short
5,154,571 A *  10/1992 Prumper ................. F04D 25/02
                                           415/124.1

(Continued)

FOREIGN PATENT DOCUMENTS

DE    3441699 A1    5/1986
DE    4241141 A1    6/1994
(Continued)

*Primary Examiner* — Ha Dinh Ho
(74) *Attorney, Agent, or Firm* — Laurence A. Greenberg; Werner H. Stemer; Ralph E. Locher

(57) ABSTRACT

An integral transmission for a transmission turbomachine has two gearwheels which are in mesh with a large wheel and which are each connected to a shaft that can be connected to an input and/or output unit. A housing, in which the gearwheels or the shafts connected thereto are supported and at least two partial housing units which can be connected by a main joint that extends through the support region of at least one gearwheel in mesh at least indirectly with the large wheel or of the shaft connected to the gearwheel. Accordingly, one of the two partial housing units is formed from at least three housing parts including a central housing part, which is assigned to the large wheel, and two side housing parts. The central housing part can be connected to an individual side housing part by a joint aligned at an angle to the main joint.

22 Claims, 4 Drawing Sheets

(51) Int. Cl.
*F16H 57/023* (2012.01)
*F04D 25/16* (2006.01)
*F01D 15/12* (2006.01)
*F04D 25/02* (2006.01)
*F16H 57/02* (2012.01)

(52) U.S. Cl.
CPC ......... *F16H 57/021* (2013.01); *F16H 57/023* (2013.01); *F16H 2057/02008* (2013.01)

(58) Field of Classification Search
USPC .......................................... 74/665 F, 606 R
See application file for complete search history.

(56) References Cited

U.S. PATENT DOCUMENTS

| | | | |
|---|---|---|---|
| 5,156,576 A * | 10/1992 | Johnson | B60K 17/105 |
| | | | 475/206 |
| 5,335,496 A * | 8/1994 | Azuma | B60K 17/105 |
| | | | 60/487 |
| 5,382,132 A | 1/1995 | Mendel | |
| 7,559,200 B2 | 7/2009 | Rodehau et al. | |
| 8,414,250 B2 | 4/2013 | Hansen et al. | |
| 9,631,623 B2 | 4/2017 | Spanel et al. | |
| 9,714,658 B2 * | 7/2017 | Miyata | F04D 17/12 |
| 2016/0115963 A1 | 4/2016 | Kempter et al. | |

FOREIGN PATENT DOCUMENTS

| | | |
|---|---|---|
| DE | 102011003525 A1 | 8/2012 |
| DE | 102012022131 A1 | 5/2014 |
| DE | 102014207283 A1 | 10/2014 |
| DE | 102013208564 A1 | 11/2014 |
| EP | 0512568 A1 | 11/1992 |
| EP | 1691081 A2 | 8/2006 |
| EP | 2128448 A2 | 12/2009 |
| FR | 706698 A | 6/1931 |
| GB | 880885 A | 10/1961 |
| JP | H10246198 A | 9/1998 |

* cited by examiner

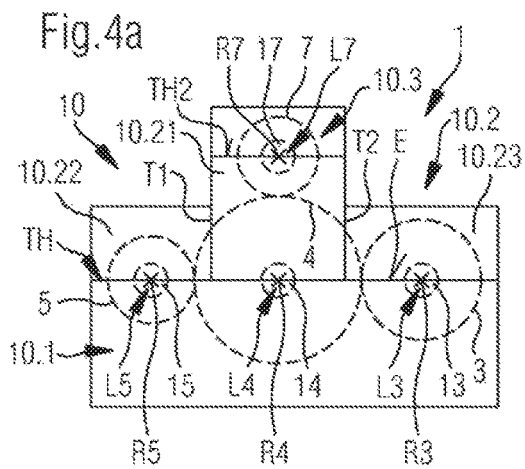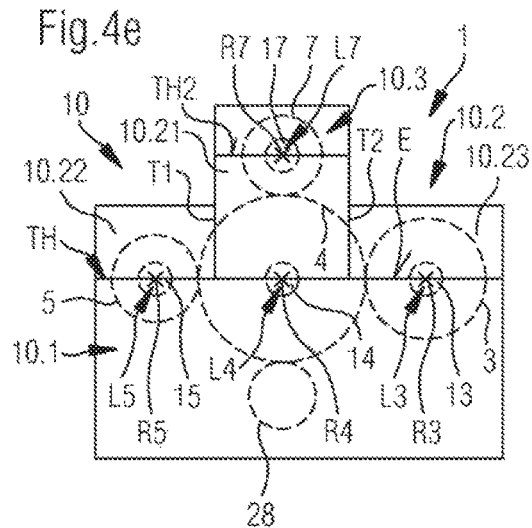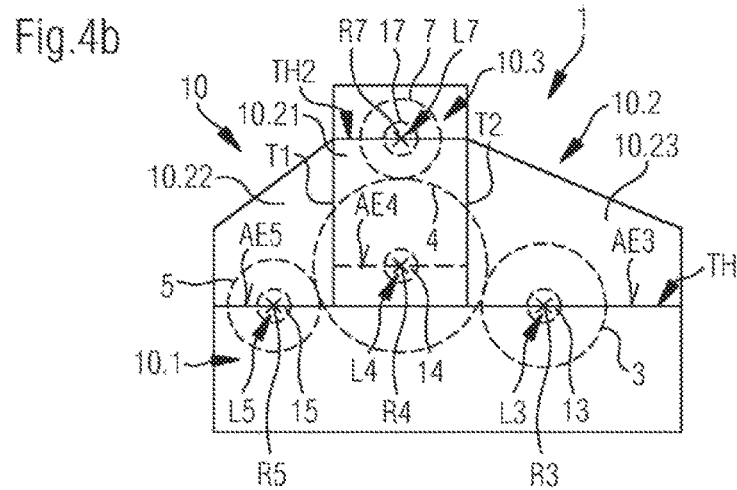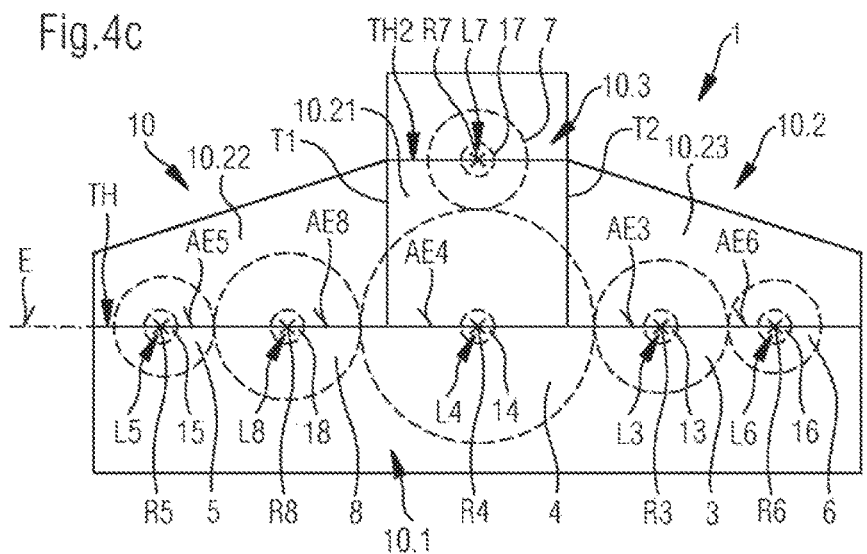

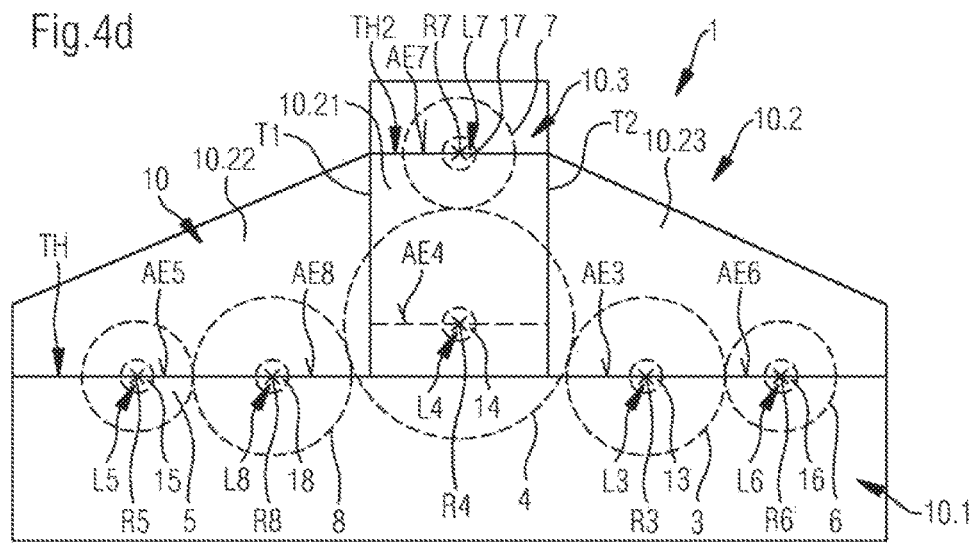
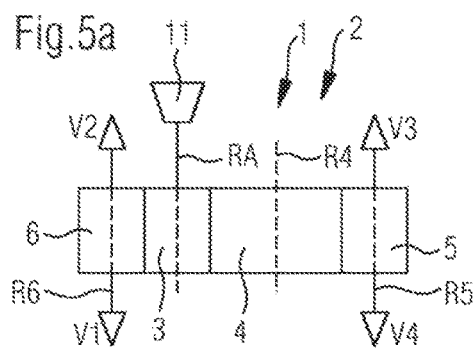
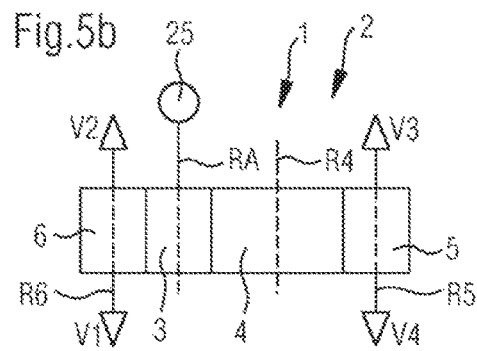
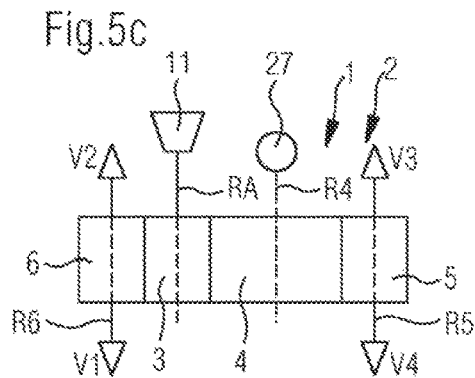
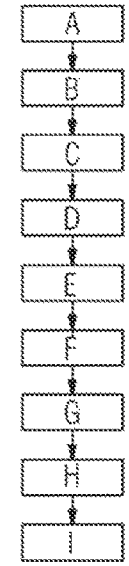

TRANSMISSION AND TRANSMISSION TURBOMACHINE

BACKGROUND OF THE INVENTION

Field of the Invention

The invention relates to a transmission, in particular an integral transmission for a transmission turbomachine, more particularly having the features from the preamble of the main transmission claim. The invention furthermore relates to a transmission turbomachine and to a method for assembling a transmission turbomachine of this kind.

A transmission turbomachine integrates input and/or output units by way of an integrated transmission (integral transmission) to form a machine drive train. Possible input units, either alone or in combination, are steam turbines, gas turbines, expanders and motors, and possible output units, either alone or in combination, are compressors and generators. The transmission turbomachines are thus designed as transmission compressors or expander systems or as a combination of both. In general, a complete transmission turbomachine is designed as a drive train, wherein the input and output units, in particular steam turbines, gas turbines, expanders, motors and compressors, interact with one another via the transmission in terms of processes, depending on the design of the transmission turbomachine. Transmission turbomachines of this kind and transmissions integrated into said turbomachines are already known from the prior art in a large number of embodiments. Attention is drawn to the documents mentioned below as a representative sample:
EP 2 128 448 A2
EP 1 691 081 B1
DE 10 2012 022 131 A1
DE 10 2011 003 525 A1
DE 10 2013 208 564 A1

In general, integrated transmissions are characterized by an input shaft connected to an input unit, e.g. in the form of an electric motor or a turbine, in particular steam or gas turbine. The input shaft carries a helically toothed input gearwheel, which is in mesh with at least one output gearwheel, preferably a plurality of output gearwheels, at least indirectly. The output gearwheels are connected for conjoint rotation (rotationally fixed) to respective output shafts or are embodied integrally therewith.

Documents EP 1 691 081 B1 and EP 2 128 448 A2, for example, each disclose an embodiment in which the input gearwheel is arranged as an intermediate wheel between an output gearwheel and a gearwheel referred to as a large wheel. Here, the axes of rotation or rotational axes of the large wheel, the input gearwheel and the output gearwheel are arranged in one plane, thereby making it possible to obtain a simple transmission housing design since the housing can be divided into two partial housing units by means of a main joint, which extends through the support regions of the abovementioned gearwheels. During assembly, the two partial housing units are joined together at the main joint, wherein the first, lower partial housing unit, when viewed in the installation position, is arranged on a foundation, for example. The lower partial housing unit is connected to the second partial housing unit arranged thereabove. If at least one additional output gearwheel arranged outside the main joint is provided, an additional, third partial housing unit is optionally connected separately to the second partial housing unit, arranged above the lower partial housing unit, after the installation of the additional output shafts. The second partial housing unit can therefore also be referred to as a central housing unit. The shafts coupled to the output gearwheels are coupled to output units, e.g. compressors of individual compressor stages. Owing to the required alignment of the shafts coupled to the output units, the transmission cannot be installed as a fully preassembled transmission. In the case where the turbomachine is designed as a transmission compressor, therefore, a housing divided into the two or three partial housing units is provided in a first method step, wherein the lower partial housing unit is positioned in the installation position and the large wheel and optionally an intermediate wheel are supported in the main joint. Depending on the size of the turbomachines, at least part, or the entire rear wall, of the compressor, optionally with an already integrated seal, is installed on the lower partial housing unit. This is followed by the installation of the individual output gearwheels, which are arranged in the main joint, and of the shafts carrying said gearwheels. During this process, the rotors of the compressors are mounted on the shafts carrying the output gearwheels, i.e. are connected for conjoint rotation thereto. After the mounting of the compressor housing on the rear walls of the individual compressors, the second, upper partial housing unit is placed on as a complete unit and connected to the lower partial housing unit. Where additional output gearwheels in mesh with the large wheel and arranged offset in a vertical direction with respect to the axis of rotation thereof are provided, this is followed by the same assembly steps at an additional, upper joint, which is offset vertically with respect to the main joint. Disassembly takes place in the reverse sequence. The individual bearings are protected by removable bearing covers. To allow work on individual output shafts during assembly or disassembly, in particular for adjustment and maintenance purposes, it is necessary for the upper partial housing unit to be completely removed. If the transmission turbomachine has already been assembled, this requires laborious removal of all the output gearwheels and output units, the axes of rotation of which are arranged vertically above the large wheel, and of the third partial housing unit connected to the second partial housing unit. Moreover, the lower partial housing unit supports the input and output gearwheels supported in the main joint, as well as the large wheel, during assembly and disassembly, in the state in which the central partial housing unit connected to the lower partial housing unit has been removed, and this can lead to deformations of the lower partial housing unit, especially to bulging and opening out of the lower partial housing unit. During subsequent reassembly with the upper partial housing units, these deformations lead to inaccuracies of fit, sealing problems, misalignment of the individual shafts carrying the gearwheels, in particular of the output shafts, changes in play and impairment of the gearing contact patterns.

A similar problem also arises with the formation of the housing from two partial housing units for an arrangement according to DE 10 2013 208 564 A1, which has a large wheel offset in a vertical direction and a stepped main joint.

DE 10 2011 003 525 A1 discloses a housing embodiment having a plurality of partial housing units arranged one above the other, wherein two gearwheels, which mesh with a large wheel and the axes of rotation of which are offset vertically with respect to the axis of rotation of the large wheel, are supported in two partial housing units, which are connected by means of a joint with a step. These partial housing units are an upper partial housing unit and a central partial housing unit of a housing. Here, the large wheel itself and two additional gearwheels in mesh therewith, or the shafts thereof, are supported in the partial housing unit which is central in the installation position and in a lower partial housing unit. In this embodiment too, the partial housing units accommodating the large wheel are of integral design, for which reason there are the same problems as those described in relation to the abovementioned embodiment when disassembly is required.

SUMMARY OF THE INVENTION

It is therefore the underlying object of the invention to develop a transmission, in particular an integral transmission for a transmission turbomachine of the type stated at the outset, in such a way that the disadvantages of the prior art are avoided. The transmission should be simple to assemble and disassemble and should ensure good accessibility to the individual shafts supported in the main joint and to the bearings provided. Inaccuracies of fit and sealing problems at the main joint and furthermore the changes in the play (axial play and radial play) between the individual components, caused by deformation, and in the alignment of the individual components and shafts relative to one another and in the gearing contact patterns should be reliably avoided.

A transmission, in particular an integral transmission for a transmission turbomachine, comprising:
  at least two gearwheels, which are in mesh at least indirectly with a large wheel and which are each connected to or formed integrally with a shaft that can be connected to an input and/or output unit, and
  a housing, in which the gearwheels or the shafts connected thereto are supported, and which comprises at least two partial housing units—a first partial housing unit and a second partial housing unit—which can be connected by means of a main joint that extends through the support region of at least one gearwheel in mesh at least indirectly with the large wheel or of the shaft connected to said gearwheel,
is characterized according to the invention in that one of the two partial housing units to be connected to one another is formed from at least three housing parts—a central housing part, which, in particular, is assigned to the large wheel, and two side housing parts, wherein the central housing part can in each case be connected to an individual side housing part by means of a joint aligned at an angle to the main joint.

In this case, the central housing part accommodates, in particular, at least part of the large wheel, that is to say that one part of the large wheel is arranged in the space bounded by the central housing part. At least one or more gearwheels supported in the main joint and in mesh at least indirectly with the large wheel are then at least partially accommodated by one of the side housing parts, i.e. part of the respective gearwheel accommodated by a side housing is arranged in the space bounded by said housing.

The term "integral transmission" stands for transmissions which in a transmission turbomachine, which can be in the form of an expansion machine or a compression machine or transmission compressor or a combination of the two. In particular, integral transmission furthermore means that the expander housing or the compressor housing are flanged directly to or integrated with the transmission housing.

The terms "main joint" and "joint" of the housing describe, in particular, the boundary line/boundary surfaces between two interconnected housing components of the housing. The main joint extends through at least one support region of a gearwheel which is in mesh with the large wheel at least indirectly, i.e. directly or via interposed gearwheels, preferably at least through the support region of at least one output gearwheel.

The second partial housing unit is divided into the at least three housing parts as it were in the direction of view along the main joint side accommodating the support regions of the individual gearwheel-carrying shafts, i.e. not in the direction of view along the axes of rotation of the shafts supported therein but transversely thereto.

In particular, the individual joint is aligned on the second partial housing unit in a direction of view, when looking at the transmission in the assembled state, toward the transmission side on which the main joint extends through the support regions of at least one gearwheel in mesh at least indirectly with the large wheel, preferably of a gearwheel directly in mesh with said large wheel, at an angle to the main joint, preferably perpendicularly to the main joint. The joints of the second partial housing unit are thus arranged in such a way that, when the connections between the side housing parts and the first partial housing unit at the main joint are released and the connections with the central housing part are released, movement of these side housing parts away from the central housing part and access to the shafts, supported in the main joint, of the gearwheels in mesh with the large wheel is possible.

In particular, the individual joint is preferably arranged in such a way that, in the assembled state of the two partial housing units, said joint is arranged in such a way that it extends between the shaft of the large wheel and the shaft of a gearwheel in mesh at least indirectly with the large wheel, in particular of a gearwheel directly in mesh with the large wheel and supported in the main joint. In a view of the transmission looking toward the faces of the large wheel and of the gearwheels in mesh therewith, the individual joint of the second partial housing unit extends, in particular, with a direction component in a vertical direction, starting from the main joint. In other words, when the individual joint with the axes of rotation of the shafts supported in the main joint is projected into a common plane in the assembled state of the transmission, it extends between these.

Depending on the selected configuration and design of the transmission turbomachine, the transmission preferably comprises not only the large wheel but also at least one output gearwheel, which can be coupled to an output unit via an output shaft, and furthermore at least one or more further gearwheels selected from the following group of gearwheels, which are each in mesh at least indirectly with the large wheel:
  a further, second output gearwheel;
  an intermediate wheel having an intermediate wheel shaft, said intermediate wheel being arranged between an output gearwheel and the large wheel;
  an input gearwheel having an input shaft;
wherein the main joint extends through the support regions of at least two of the gearwheels, preferably through the support regions at least of the output gearwheels, particularly preferably through the support regions of an individual output gearwheel, of the input gearwheel and optionally of the intermediate wheel, very particularly preferably through the support regions of an individual output gearwheel, of the input gearwheel, of the large wheel and of the intermediate wheel.

Through the division of the second partial housing unit, the solution according to the invention allows rapid and simple accessibility, during assembly and disassembly, to individual shafts and bearings of the gearwheels supported in the housing in the region of the main joint. In particular, if the central housing part is arranged in the region of extent of the large wheel, the solution according to the invention allows simple and rapid accessibility to the individual input and/or output shafts of the gearwheels in mesh at least indirectly with the large wheel, simply by removing the side housing parts. The central housing part remains connected to the first partial housing unit by means of the main joint. If there is provision of further output gearwheels that are in mesh with the large wheel and with the shafts carrying the latter, the axes of rotation of which are mounted in a further joint on the central housing part, in a position offset with respect to the main joint, there is no need first of all to laboriously remove an output unit connected to these, the output unit continuing to be supported via the central housing part of the first partial housing unit.

Owing to the provision of a connection between the central housing part and the first partial housing unit during assembly and the retention of this connection during disassembly by removal of the side housing parts, the central housing part furthermore acts as a reinforcing element for the compressor and/or expander housing at the main joint. The bulging of the first partial housing unit, as observed in the prior art, and the resulting disadvantages in respect of inaccuracies of fit, sealing problems, changes in the alignment of the individual shafts relative to one another, in the play between the individual components and in the gearing contact pattern can be reliably prevented without the need to additionally provide reinforcing measures thereon.

As regards the support for the large wheel in the housing itself, there are a number of possibilities. According to a first possibility of support, the large wheel or the large-wheel shaft connected thereto or formed integrally therewith is supported in the main joint between the first partial housing unit and the central housing part of the second partial housing unit. According to a second possibility of support in the first, and hence lower, partial housing unit. In the case of both possibilities, the large-wheel shaft is supported directly on the partial housing unit which is at the bottom in the installation position, and therefore the main function of the central part is that of a reinforcing element. According to a third possibility of support, support can also be provided directly in the central housing part, which is then supported on the lower partial housing unit.

As regards the embodiment of the transmission in respect, more specifically, of the gearwheels that can be supported in the main joint, there are a number of possibilities.

According to a first basic configuration, the large wheel is designed as an input gearwheel having a large-wheel shaft that can be connected to an input unit. In a first variant, the gearwheels in mesh with the large wheel are formed by output gearwheels connected for conjoint rotation to respective output shafts, or, according to a second variant, by gearwheels in the form of intermediate wheels in mesh with an output gearwheel, wherein the at least two partial housing units can be connected by means of a main joint extending through the support regions of at least one of the output gearwheels and/or of an intermediate wheel or of the respective shafts connected thereto. Here, it is also possible to conceive of embodiments in which the large wheel is in direct mesh with an output gearwheel and an intermediate wheel.

In a second basic configuration, one of the gearwheels in mesh with a large wheel is formed by an input gearwheel that can be connected for conjoint rotation to an input shaft. According to a first variant, a first output gearwheel in mesh with the large wheel, together with an output shaft, or, according to a second variant, an intermediate wheel, is furthermore formed, wherein the at least two partial housing units can be connected by means of a main joint extending through the support regions of at least one of the output gearwheels, of the input gearwheel and/or of the intermediate wheel or of the shafts connected thereto. In this second basic configuration, it is optionally possible, in addition, for the large wheel to be coupled to an input unit.

As a development of the second basic configuration, at least one second output gearwheel, which is in mesh with the input gearwheel and which is connected to a second output shaft, is provided, wherein the support region of the second input gearwheel is arranged in the main joint and the second output gearwheel is preferably accommodated in the side housing part at least partially accommodating the input gearwheel. This allows simple integration of an output unit, which is driven at a higher speed.

In addition or as an alternative to the abovementioned variants of possible transmission configurations, the first output gearwheel can be arranged and designed to be in operative connection with the large wheel via an intermediate wheel, wherein the support region of the intermediate wheel is also arranged in the main joint and the intermediate wheel is accommodated at least partially by the side housing part that can be connected to the central housing part. In a first variant, the side housing part is designed and arranged in such a way that it likewise accommodates the output gearwheel in mesh therewith. In a second variant, the side housing part accommodating the intermediate wheel is connected to a further housing part, which at least partially accommodates the output gearwheel in mesh with the intermediate wheel. In this case, the second partial housing unit comprises at least four housing parts. The additional integration of an intermediate wheel in the transmission offers the advantage of a significant increase in the performance that can be achieved, despite the increase in the number of components. Moreover, taking into account a minimum spacing between the individual output and input shafts, which is determined by the size of the input and output units to be attached, the additional intermediate wheel allows flexibility in the choice of the pitch diameter of the large wheel and of the pinions. In the case of a large wheel with an unchanged pitch diameter relative to an arrangement without an intermediate wheel, it is possible, in particular, to enlarge the available installation space for the mounting of the input and output units on the housing or of the pinions of the transmission.

In an advantageous embodiment, the input gearwheel and/or the individual output gearwheels are embodied as pinions which are connected for conjoint rotation to pinion shafts or form an integral modular unit therewith. The outlay on components and on assembly is thereby considerably minimized. The teeth are preferably designed as helical teeth. The individual input and output shafts are arranged parallel to one another.

In an advantageous embodiment of the transmission according to the invention, the individual joint provided between the central housing part and a side housing part of the partial housing unit is designed to extend at an angle in a range of from 39° to 150°, preferably 45° to 135°, particularly preferably 90°, to the main joint. The perpendicular design offers the advantage of a short joint and hence smaller sealing surfaces to be provided, while the joints formed in said angular ranges perform a guiding function during the installation and removal of the side housing parts and thus facilitate the alignment of the component parts of the housing.

In another advantageous embodiment, the individual joint provided between the central housing part and a side housing part of the second partial housing unit is arranged outside the support region of an individual gearwheel, particularly preferably outside the support region of the large wheel, preferably within the tip diameter of the large wheel or within a region of extent which corresponds to the region of extent of the tip diameter when this is projected into a plane perpendicular to the main joint. The region of connection between the first partial housing unit and the central housing part is thus shifted into a region which, through stiffening, counteracts the weight and deformation forces due to the cantilever support of the individual output units on the respective output shafts supported in the main joint.

The design of the main joint is dependent on the arrangement of the axes of rotation or support regions of the shafts carrying the gearwheels.

The term "axis of rotation" corresponds to the geometrical axis about which rotation/turning of the individual gearwheels occurs. In general, this coincides with the center line of the respective gearwheel or of the shaft connected thereto or another rotationally symmetrical component coupled thereto.

According to a particularly advantageous embodiment, the axes of rotation at least of the gearwheels arranged in the main joint or of the shafts connected thereto are arranged in a single plane of arrangement, and the main joint is of flat design. This allows simple partial-housing geometries and avoids undercuts, such as those in the case of stepped joints.

In an alternative embodiment, the axes of rotation of at least two gearwheels arranged in the main joint or of the shafts connected thereto are arranged in different planes of arrangement, and the main joint is of stepped design. The geometry and dimensioning, in particular the step heights, can be freely selected, taking into account the size of the gearwheels, especially of the large wheel, of the input and output gearwheels or of the shafts connected thereto and/or the size of the dividable housing.

If the axis of rotation of the large wheel is arranged offset in a vertical direction with respect to the plane of arrangement of the input gearwheel and the first output gearwheel, the offset arrangement brought about by the shifting of the large wheel in a vertical direction allows engagement of the input gearwheel and of an output gearwheel in a region of the outer circumference which is characterized by a smaller width than the diameter of the large wheel when viewed in the direction of extent of the transmission perpendicularly to the axes of rotation of the individual gearwheels. The extent of the transmission in this direction is thereby considerably shortened. Moreover, the offset arrangement of the large wheel offers the advantage of better compensation of transverse forces and hence optimization of the load distribution within the transmission, this being reflected in an increase in the life of the transmission components, especially the bearings.

To allow use in a transmission turbomachine having a plurality of output units, e.g. at least two or three compressors, at least one further output gearwheel is provided, which is in mesh with the large wheel and the axis of rotation of which is arranged offset with respect to the main joint, in particular in a vertical direction. According to a first embodiment, the further output gearwheel is supported as a stub shaft pinion in one of the partial housing units. According to a second embodiment, it is arranged in a further housing joint arranged offset with respect to the main joint.

The housing can be designed as a cast or welded component.

In transmission turbomachines, the first partial housing unit is preferably formed by a transmission housing bottom part and the second partial housing unit is preferably formed by an upper transmission housing part, which is arranged above said bottom part, i.e. above the bottom part in a vertical direction, which upper part, depending on the housing configuration, can be referred to as the transmission housing top part or, if further transmission housing parts arranged above said upper part are provided, as a transmission housing central part. The main joint between the transmission housing bottom part and the upper transmission housing part—transmission housing top part or transmission housing central part—arranged above the transmission housing bottom part extends in a horizontal plane or, where step changes are provided, in a plurality of horizontal planes. This upper transmission housing part is divided into at least three or even more housing parts, wherein the central housing part is arranged in the region of the large wheel. If there is a requirement for access to the input and output shafts supported in the main joint, the central housing part remains connected to the transmission housing bottom part and thus essentially increases the stiffness of the transmission, in particular of the housing in the partially disassembled state.

The individual joints and/or the main joint can be embodied in different ways in respect of their design, structural embodiment and surface treatment. The connections between the individual housing components which are made via the joints and/or the main joint can likewise be freely selected, taking into account the required accessibility when assembly/disassembly is desired. In this case, connections selected from the following group of connections or a combination thereof are used:

nonpositive connection, in particular fastening elements;
positive connection.

As already explained, the transmission embodied according to the invention is integrated in a transmission turbomachine to form a machine drive train in order to make an effective connection between input and/or output units by connection to the individual shafts connected to the input and/or output gearwheels. In this case, the input and/or output unit connected to at least one of the input and/or output shafts can be formed by a rotor of a compressor stage and/or a rotor of an expander stage.

The input unit that can be coupled to the input gearwheel can be embodied as a machine selected from the group comprising the machines mentioned below:

turbo engine
electric drive motor
internal combustion engine

The transmission designed in accordance with the invention is simple to assemble and disassemble and allows simple accessibility to the gearwheels supported in the main joint while maintaining high stiffness of the transmission housing and, if there are any additional output units supported outside the main joint, without the need to remove said units. The method for assembly is characterized by the following method steps:

providing a housing which comprises at least two partial housing units—a first partial housing unit and a second partial housing unit—which can be connected by means of a main joint that extends through the support regions of the gearwheels to be supported in said housing or of the shafts connected thereto, wherein one of the partial housing units to be connected is formed from at least three housing parts—a central housing part and two side housing parts, wherein the central housing part can be connected to an individual side housing part in each case by means of a joint aligned at an angle to the main joint;

installation of a first partial housing unit, which is at the bottom in the installation position and is preferably of integral design;

installation of the large wheel and optionally of a gearwheel in mesh with said large wheel in/on the first partial housing unit, preferably in the main joint of the first partial housing unit;

installation of the central housing part so as to at least partially surround the large wheel, and connection to the first partial housing unit at the main joint;

installation of the gearwheels in mesh with the large wheel and supported in the main joint, together with the gearwheel shaft and the rotatable output unit component mounted on the shaft;

installation of the side housing parts to form the second partial housing unit by joining to the central housing part and the first partial housing unit.

If the transmission turbomachine is designed as a transmission compressor and the individual output units are embodied as compressors, the rotors of the compressors can be installed with the individual output shafts and, after installation of the rear wall on the housing, the compressor housings can be installed on the rear wall. The rear wall can be installed as a modular unit or in individual parts and, furthermore, the installation of the rotors with the gas seals and the rear wall can take place in one or in different method steps.

If an additional compressor stage supported on the central housing part and on a further third partial housing outside the main joint is driven via the large wheel, the further compressor stage is installed after the installation of the second partial housing, in particular of the central housing part.

BRIEF DESCRIPTION OF THE SEVERAL VIEWS OF THE DRAWING

The solution according to the invention is explained below with reference to figures. In said figures, the following is illustrated more specifically:

FIGS. 4a to 4e show, in schematically simplified form, possible embodiments of transmissions;

FIGS. 5a to 5c show, by way of example, a possible use as an integral transmission in transmission turbomachines for transmission compressor systems;

FIG. 6 uses a flow diagram to illustrate, by way of example, the sequence of individual method steps during the assembly of a transmission turbomachine in the form of a transmission compressor.

DESCRIPTION OF THE INVENTION

The same reference signs are used in each case for the same elements in the figures.

Figure 1A:
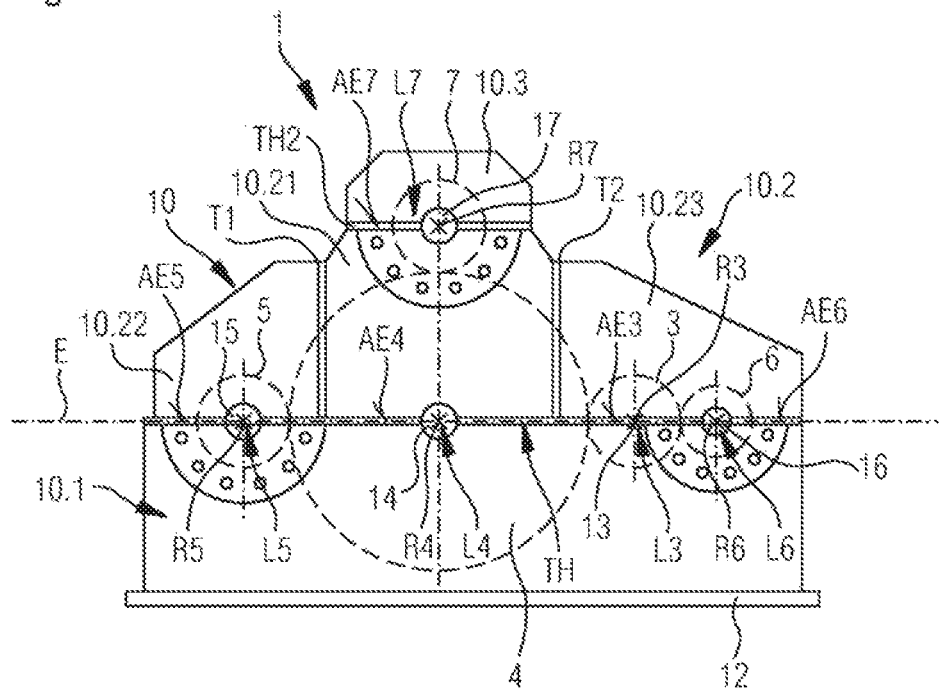
FIG. 1a shows, in a schematically simplified illustration, the basic construction of an integrated transmission embodied in an illustrative way, in a view from the front, in the installed position and in the assembled state.
Figure 1B:
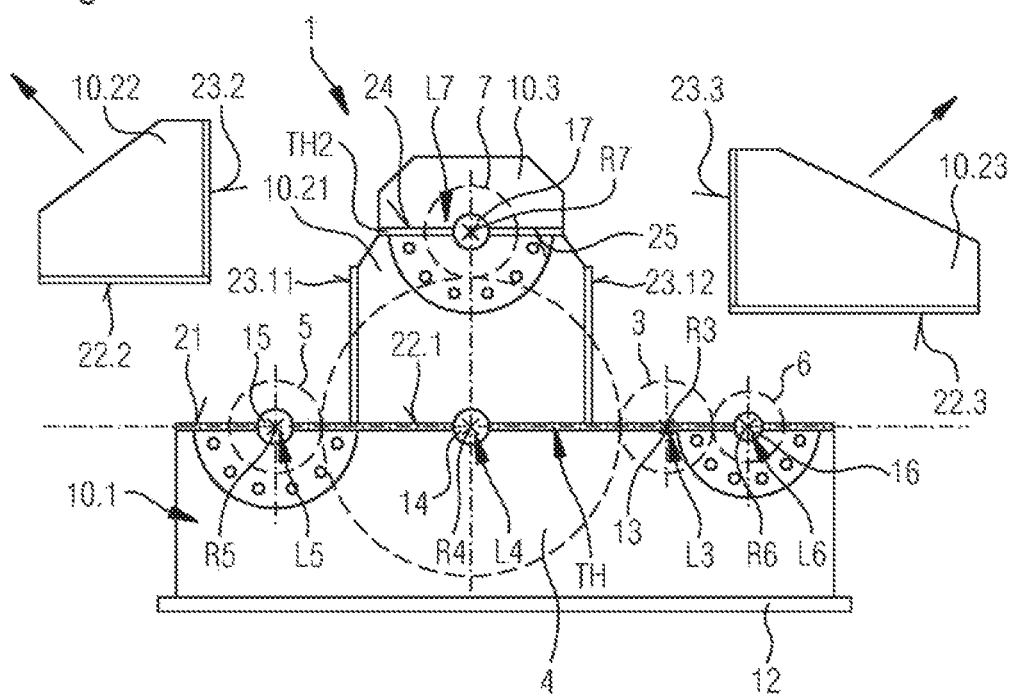
FIG. 1b shows, in a schematically simplified illustration, the transmission shown in FIG. 1a during the removal of the side housing parts.
Figure 3:
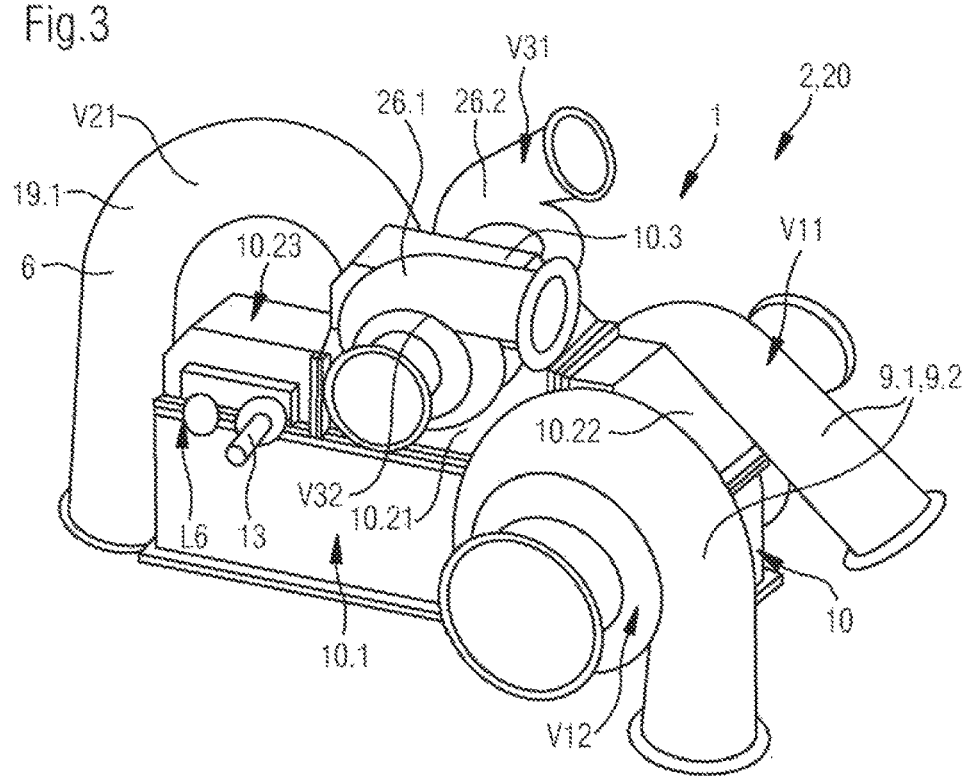
FIG. 3 illustrates the integration of a transmission designed in accordance with the invention and as shown in FIG. 1a in a transmission turbomachine.

FIGS. 1a and 1b show, in a schematically highly simplified illustration, one possible embodiment of a transmission 1, in particular of an integral transmission for a transmission turbomachine 2 of a machine drive train, having a housing 10 embodied in accordance with the invention. One embodiment of a transmission turbomachine 2 is depicted by way of example in FIG. 3. By means of the transmission 1, this integrates input and/or output units to form a drive train. Steam turbines, gas turbines, expanders and motors can be used as input units, and compressors and generators can be used as output units. The individual units are coupled to one another and mounted on one or more base frames, e.g. machine foundations. Here, FIG. 3 shows, by way of example, a transmission turbomachine 2 in the form of a transmission compressor 20, having a transmission as shown in FIGS. 1a and 1b in a perspective view.

The transmission 1 for a transmission turbomachine 2 comprises an input gearwheel 3 embodied integrally with an input shaft 13 or connected to said shaft. The transmission 1 furthermore comprises a large wheel 4, which is in mesh with the input gearwheel 3, and at least one, preferably a plurality of, further gearwheels, which are referred to below as output gearwheels 5, 6 and 7. By virtue of their design/dimensioning relative to the large wheel 4, these are also referred to as pinions, and the shafts 15, 16, 17 connected thereto are referred to as pinion shafts. In this arrangement, at least one output gearwheel, here a first output gearwheel 5, is in mesh at least in a mediated way, i.e. directly or indirectly, with the large wheel 4 in one development of the embodiment from FIG. 1a in accordance with FIG. 4c or 4d, with an intermediate wheel 8 arranged in between. The intermediate wheel 8 illustrated in FIG. 4c or 4d is connected to an intermediate wheel shaft 18, and the support region is denoted by L8.

The design shown in FIGS. 1a and 1b furthermore comprises a second output gearwheel 6, which is in mesh with the input gearwheel 3. In addition, a third output gearwheel 7 having a shaft 17 carrying the latter is provided. The large wheel 4, the input gearwheel 3 and the output gearwheels 5, 6, 7 or the respective shafts 14, 13, 15, 16, 17 connected thereto are supported in a housing 10.

The theoretical axes of rotation R3 of the input gearwheel 3, R5 of the first output gearwheel 5 in mesh with the large wheel 4, R4 of the large wheel 4 and R6 of the second output gearwheel 6 are each arranged in regions of arrangement AE3, AE4, AE5, AE6. These can be arranged offset with respect to one another, e.g. offset with respect to one another in a vertical direction—as depicted, for example, for an offset large wheel 4 in FIG. 2—or, alternatively, at least individual regions of arrangement can be situated in a common plane of arrangement E, as illustrated in FIG. 1a. Here, the theoretical axes of rotation correspond to the geometrical rotational axes of the respective gearwheels or the shafts connected thereto.

The axis of rotation R7 of a further, third output gearwheel 7 is arranged offset in a vertical direction with respect to the plane of arrangement E. The individual gearwheels— the input gearwheel 3, the large wheel 4 and the further gearwheels 5, 6 and 7 are arranged in a housing 10 and are supported in the latter in what are referred to as support regions L3, L4, L5, L6 and L7. For this purpose, the housing 10 is divided into at least two partial housing units 10.1 and 10.2, in this case three partial housing units 10.1, 10.2 and 10.3, wherein the main joint TH between the partial housing units 10.1, 10.2 extends through the support regions L3, L4, L5 and L6. Joint TH2, which extends between the partial housing units 10.2 and 10.3, extends through support region L7 of output gearwheel L7. It is self-evident that, when the gearwheels or the shafts connected thereto are supported on both sides in the housing 10, two such support regions L3, L4, L5, L6 and L7 must be provided in the housing 10, being arranged on both sides of the respective gearwheel.

In the embodiment shown in FIG. 1a, the main joint TH is preferably straight, i.e. lies in a horizontal plane E. This applies analogously also to the further main joint TH2 between the second and the third partial housing unit.

The transmission 1 is depicted in the installation position. The transmission 1 can be arranged in this form on a foundation 12. It is self-evident that the main joint TH, the path of which is characterized by the arrangement of the support regions L3, L4, L5, L6 of the individual gearwheels—in this case the large wheel 4, the input gearwheel 3 and output gearwheels 5, 6, does not have to extend in a single plane E, even if the axes of rotation R3, R4, R5, R6 of the individual gearwheels 3, 4, 5, 6 are situated in said plane. Differences, in particular steps in the form of projections or recesses required by further additional components, are likewise possible. The decisive factor is that the contour and path of the main joint TH is embodied so as to extend at least through the support regions of the gearwheels supported in said joint, in particular L3, L4, L5 and L6 of the gearwheels or of the shafts 13, 14, 15 and 16 connected thereto.

Here, the first partial housing unit 10.1 forms the partial housing unit 10.1 which is at the bottom in the installation position and the second partial housing unit 10.2 forms the partial housing unit 10.2 arranged above the latter in a vertical direction. If the housing is embodied with a third partial housing unit 10.3, the second partial housing unit 10.2 is also referred to as the central partial housing unit.

According to the invention, the second partial housing unit 10.2 is of multi-part design, i.e. is divided into at least three housing parts, wherein the joints T1 and T2 are designed to extend at an angle in a range of from 30° to 150°, preferably 45° to 135°, particularly preferably at an angle of 90°, to the main joint TH. The at least three housing parts are formed by a central housing part 10.21 and respectively by side housing parts 10.22 and 10.23 connected to said central part via the joints T1 and T2. The connection between the central housing part 10.21 and the side housing parts 10.22 and 10.23, which are arranged on both sides, i.e. on mutually opposite sides of the central housing part 10.21, is made in the region of the respective joints T1 and T2. The connection between the housing parts comprising the central housing part 10.21 and the side housing parts 10.22 and 10.23, as component parts of the second partial housing unit 10.2, and the partial housing unit 10.1 is made in the region of the main joint TH. For this purpose, the individual mutually facing component parts of the housing are designed with corresponding joining regions 21 at the main joint TH and 22.1, 22.2 and 22.3 on that side of the central housing part 10.21 and the side housing part 10.22 or 10.23 of partial housing unit 10.2 which faces the main joint TH in the installation position. The joining regions on the side housing parts 10.22 and 10.23 for connection to the central housing part 10.21 are denoted by 23.2 and 23.3. The joining regions on the central housing part 10.21 are denoted by 23.11 and 23.12. The structural design of the joining regions is implemented in a manner dependent on the selected connecting devices for joining the individual component parts of the housing to the overall housing 10. There is a multiplicity of possibilities for these devices, wherein releasable and nonpositive connecting devices are preferably selected. In this case, the component parts of the housing are preferably designed with flange surfaces in the region of the main joints TH and joints T1, T2, TH2 thereof, said flanges making it possible to accommodate and/or guide nonpositive connecting devices, in particular fastening elements, e.g. screws and threads.

Partial housing unit 10.3 is connected to the central housing part 10.21 by means of joint TH2. The above statements relating to the structural design and dimensioning of joints can be applied to this. Partial housing unit 10.3 is preferably dimensioned and designed in such a way that it extends substantially over the extent of the central housing part 10.21 in a direction transverse to the shafts supported therein, thereby making it possible to carry out removal of the side housing parts 10.22, 10.23 independently of partial housing unit 10.3 and of the shafts supported therein and of the output units connected to these.

Joints T1 and T2 are arranged outside the support regions L3, L4, L5 and L6. They are preferably arranged within the extent of the tip diameter of the large wheel 4 when said diameter is projected into the main joint. As a result, the selected dimensions of the connecting region between the central housing part 10.21 and partial housing unit 10.1 can be as large as possible, ensuring that housing part 10.1 is stiffened over a relatively large region of extent by the connection of the mutually opposite housing walls via the central housing part.

FIG. 1a shows the assembled state, while the removal of the side housing parts 10.22 and 10.23 is depicted in FIG. 1b. It can be seen that the output units that can be attached via the shaft supported in partial housing 10.3 do not have to be removed in order to gain access to the shafts supported in the main joint outside the central housing part 10.21 since partial housing unit 10.3 can remain connected to the central housing part 10.21. Assembly and disassembly are thus considerably simplified.

Figure 2:
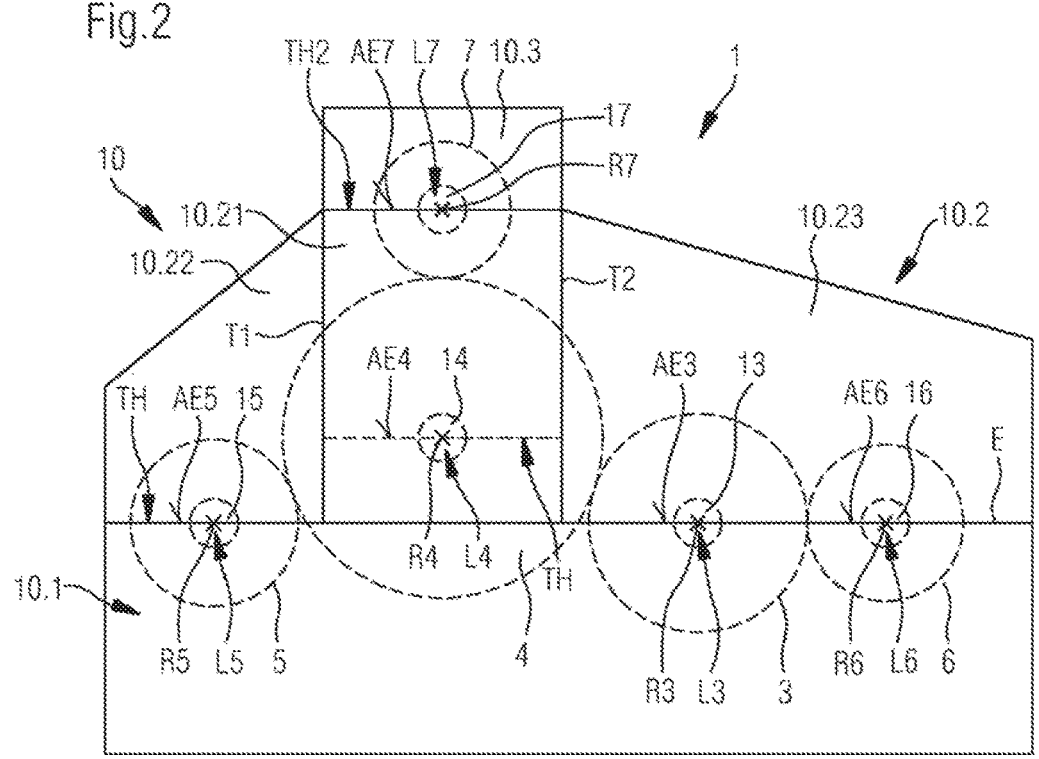
FIG. 2 shows, by way of example, one embodiment of a transmission in accordance with FIG. 1a with an offset large wheel.

FIG. 2 shows, by way of example and in schematic, highly simplified form, a modified embodiment of a transmission 1 as shown in FIG. 1a with a main joint TH having an axis of rotation R4 of the large wheel 4 offset with respect to the axes of rotation R5, R6 of the output gearwheels 5, 6. The axes of rotation R3 of the input gearwheel 3 and R5 of the first output gearwheel 5 in mesh with the large wheel 4 and R6 of the further, second output gearwheel 6 meshing with the input gearwheel 3 are arranged in a common plane of arrangement E. The shafts 13, 15, 16 are supported in a common main joint TH; wherein the planes of arrangement AE3, AE5 and AE6 are here situated in a horizontal plane E in the installation position, by way of example. To improve load distribution and better implement a more compact construction in the axial direction, the axis of rotation R4 of the large wheel 4 is arranged offset in a vertical direction with respect to the plane of arrangement E of the input gearwheel 3 and of the first output gearwheel 5. Here, the shaft 14 carrying the large wheel 4 is arranged above the plane E, in a plane of arrangement AE4. The offset entails a step between the regions of arrangement such that the angle between a theoretically conceived connecting line between the axis of rotation R3 of the input shaft A and the axis of rotation R4 of the large wheel 4 and between the axis of rotation R4 of the large wheel and the axis of rotation R5 of the first output gearwheel 5 is in a range of from 130° to 175°. The large wheel 4 and the gearwheels 3, 5, 6 are helically toothed. The vertically offset arrangement of the large wheel 4 results in an optimum load distribution.

The support region L4 of the large wheel 4 is arranged on the first partial housing unit 10.1 but outside the main joint of the housing 10, said main joint providing a seal with respect to the environment, in particular an oil seal.

FIG. 3 shows, in a perspective view, the integration of a transmission 1 according to the invention in a transmission turbomachine 2. This comprises a plurality of compressor stages V11, V12, V21, V31, V32, which are driven by means of output gearwheels 5, 6 and 7 in mesh at least indirectly with an input gearwheel 3 or a large wheel 4. For this purpose, rotors of the compressor stages V11, V12, V21, V31, V32 are mounted on the shafts 15, 16, 17 connected to the output gearwheels 5, 6 7, said rotors being surrounded by compressor housings 9.1, 9.2; 19.1 and 26.1, 26.2 mounted on a compressor wall. The transmission 1 is designed as in FIG. 1*a*. The individual partial housing units 10.1, 10.2, the component-part central housing part 10.21 and the side housing parts 10.22, 10.23 of the second partial housing 10.2, and the partial housing 10.3 connected to the central housing part 10.21 can be seen.

Here too, joints T1 and T2 between the central housing part 10.21 and the side housing parts 10.22 and 10.23 extend between the shafts of the large wheel and the gearwheels that are in mesh with the latter and mounted in the main joint, in a view of the transmission 1 looking toward the faces of the gearwheels in mesh with one another.

FIGS. 4*a* to 4*e* show, by way of example, further transmission configurations, in which the division according to the invention of a partial housing unit into a plurality of housing parts for the purpose of partial disassembly can be used.

FIG. 4*a* shows a first configuration of a transmission 1 having a large wheel 4 and three gearwheels in mesh therewith, by way of example an input gearwheel 3, a first output gearwheel 5 and an output gearwheel 7. It would also be conceivable to use the large wheel 4 as an input gearwheel and to form the input gearwheel 3 from an output gearwheel connected to an output shaft.

Axes of rotation R3, R4 and R5 and hence support regions L3, L4, L5 of the gearwheels 3, 5 and 4 are arranged in a common plane in the main joint TH. Axis of rotation R7 is arranged offset with respect to this in a joint TH2. Partial housing unit 10.2 forms a housing top part and is divided into the following housing parts: central housing part 10.21 and side housing parts 10.22 and 10.23. Joints T1 and T2 extend in the region of the tip diameter of the large wheel 4. The housing top part is closed by means of partial housing unit 10.3. This embodiment corresponds substantially to the configuration shown in FIG. 1*a* but without a second output gearwheel 6.

FIG. 4*b* shows the configuration according to FIG. 4*a* with an offset large wheel 4. The basic configuration thus corresponds to that described in FIG. 2 but without a second output gearwheel 6.

FIG. 4*c* shows a development of an embodiment shown in FIG. 1*a* having an additional intermediate wheel 8 between output gearwheel 5 and the large wheel 4 with a flat main joint TH, while FIG. 4*d* reproduces the configuration shown in FIG. 4*c* with an offset large wheel 4.

FIG. 4*e* shows, by way of example, an embodiment in accordance with FIG. 4*a* with at least one further output gearwheel 28, which is supported outside joint TH and is designed as a stub shaft pinion.

FIGS. 5*a* to 5*d* show, by way of example, possible uses of the transmission 1 in transmission turbomachines 2 and embodiments thereof. FIG. 5*a* shows an advantageous use in a machine drive train of a transmission turbomachine 2 in the form of a transmission compressor system having a prime mover, a transmission 1 for driving at least one or more compressors V1 to Vn, in this case V1, V2, V3 and V4. In this case, the transmission 1 is embodied as described in FIGS. 1 and 2. The input shaft 13 is connected to an input unit AM. The individual output shafts 15 and 16 connected to the output gearwheels 5 and 6 are each connected to one of the compressors and, in particular, carry a rotor of a compressor V1 to V4 of this kind.

The prime mover shown in FIG. 5*a* is embodied as a turbine 11, in particular as a steam turbine. In contrast, FIG. 5*b* shows an embodiment having a prime mover in the form of an electric motor 25.

FIG. 5*c* shows an embodiment as per FIG. 5*a* having an additional electric motor 27 at the large wheel 4. Electric motor 27 is coupled to the shaft 14 of the large wheel 4.

FIG. 6 illustrates, in schematized form and by way of example, the method steps of a possible way of assembling a transmission turbomachine 2 in the form of a transmission compressor 20, using a sequence diagram. In method step A, a housing 10 is made available, said housing comprising at least two partial housing units—a first partial housing unit 10.1 and a second partial housing unit 10.2—which can be connected by means of a main joint TH extending through the support regions of the gearwheels to be supported therein or of the shafts connected to said gearwheels, wherein one of the partial housing units to be connected, in particular the partial housing unit 10.2 which forms the upper transmission housing part in the installation position consists of at least three housing parts—a central housing part 10.21 and two side housing parts 10.22, 10.23. In B, a first partial housing unit 10.1, which is at the bottom in the installation position and is preferably of integral design, is installed or positioned, wherein, in C, the large wheel 4 and optionally also, at this early stage, a gearwheel in mesh with said large wheel, e.g. the input gearwheel 3, are arranged in the main joint TH of the first partial housing unit 10.1. Following this, the central housing part 10.21 is installed, at least partially surrounding the large wheel 4, and is connected to the lower partial housing unit 10.1 by means of the main joint. In E, a bottom part of the rear wall of an output unit, in particular a bottom part of the compressor real wall, is mounted on partial housing unit 10.1. F is characterized by the installation of at least one output gearwheel, preferably of the further output gearwheels 5 and 6 supported in the main joint, together with the gearwheel shafts and rotatable component parts of the output units, which are mounted on the respective shafts, in particular the rotors of the compressors V11, V12 and V21. This is followed, in G, by the mounting of a top part of the compressor rear wall of the individual compressors on partial housing unit 10.1. In H, the respective compressor housings are mounted on the rear wall and, in I, the side housing parts 10.22, 10.23 are installed, being connected to the central housing part 10.21 and the first partial housing 10.1 and surrounding the gearwheels 3, 5 and 6. If at least one further compressor stage is coupled to the large wheel 4, e.g. compressor stages V31 and V32 in FIG. 2, this stage is driven by means of an output gearwheel 7, which is connected to an output shaft 17 arranged in a joint TH2 provided on the central housing part 10.21 and which is in mesh with the large wheel 4. Installation is performed after method step I.

If the output gearwheels, in particular pinion shafts, are installed with the rotors mounted, a gas seal is installed with the rear wall divided, before the installation of the top part of the rear wall. Otherwise, the rear wall and gas seal are installed in one step.

The division according to the invention of the transmission housing is not restricted to the embodiments illustrated in the figures and the transmission configurations depicted for use in transmission turbomachines. The decisive point in an embodiment having gearwheels in mesh with a large wheel is that the partial housing unit should be embodied in such a way that all that is required is that those housing parts which do not accommodate the large wheel have to be removed completely during servicing and assembly, but can remain connected to the other partial housing units.

LIST OF REFERENCE SIGNS 1 transmission, in particular an integral transmission
2 transmission turbomachine, in particular transmission compressor or expansion machine
3 input gearwheel
4 large wheel
5 output gearwheel
6 output gearwheel
7 output gearwheel
8 intermediate wheel
9.1 compressor housing
10 housing
10.1,
10.2, 10.3 partial housing
10.21 central housing part
10.22, 10.23 side housing part
11 turbine
12 foundation
13 input shaft
14 large-wheel shaft
15 output shaft
16 output shaft
17 output shaft
18 intermediate wheel shaft
19.1, 19.2 compressor housing
20 transmission compressor
21 joining region
22.1, 22.2,
22.3 joining region
23.11, 23.12,
23.2, 23.3 joining region
24 prime mover
25 electric motor
26.1, 26.2 compressor housing
27 electric motor
28 output gearwheel, in particular stub shaft pinion
1, V2, V3, V4 compressor
11, V12, V21,
V31, V32 compressor
R3, R4, R5,
6, R7, R8 axis of rotation
TH main joint
T1, T2, TH2 joint
AE3, AE4, AE5,
AE6, AE7 plane of arrangement
E plane
A-I method steps

The invention claimed is:

1. A transmission, comprising:
a large wheel;
at least two gearwheels being in mesh at least indirectly with said large wheel and are each connected to or formed integrally with a shaft that can be connected to an input and/or output unit;
a housing in which said gearwheels or said shafts connected thereto are supported, said housing having at least two partial housing units including a first partial housing unit, which is at a bottom in an installation position, and a second, upper partial housing unit, which is disposed offset vertically with respect to said first partial housing unit in the installation position, said two partial housing units being connected by means of a main joint extending through a support region of at least one of said gearwheels in mesh at least indirectly with said large wheel or of said shaft connected to said one gearwheel; and
said second, upper partial housing unit is formed from at least three housing parts including a central housing part, which accommodates at least part of said large wheel, and two side housing parts, which are connected to said central housing part, said central housing part is in each case connected to one of said side housing parts by means of a joint aligned at an angle to said main joint.

2. The transmission according to claim 1, wherein at least one of said gearwheels supported in said main joint and in mesh at least indirectly with said large wheel is at least partially accommodated by one of said two side housing parts.

3. The transmission according to claim 1, wherein said large wheel has a large-wheel shaft connected to said large wheel or formed integrally therewith, said large wheel or said large-wheel shaft is supported:
in said main joint between said first partial housing unit and said central housing part of said second, upper partial housing unit;
said first partial housing unit; or
said central housing part.

4. The transmission according to claim 1, wherein:
at least one of said gearwheels in mesh at least indirectly with said large wheel is a first output gearwheel and said shaft is an output shaft;
said gearwheels which are each in mesh at least indirectly with said large wheel further include:
a second output gearwheel;
an intermediate wheel and said shaft being an intermediate wheel shaft, said intermediate wheel being disposed between one of said first and second output gearwheels and said large wheel; and
an input gearwheel having said shaft being an input shaft; and
said main joint extends through support regions of at least two of said gearwheels, namely at least said support regions of in each case one of said first and second output gearwheels, of said input gearwheel and of the intermediate wheel.

5. The transmission according to claim 1, wherein said large wheel is an input gearwheel having a large-wheel shaft that can be connected to an input output unit, and said gearwheels in mesh with said large wheel are output gearwheels connected for conjoint rotation to respective shafts being output shafts or by said gearwheels being intermediate wheels in mesh with an output gearwheel, wherein said at least two partial housing units can be connected by means of said main joint extending through said support regions of at least one of said output gearwheels and/or of said intermediate wheel or of respective shafts connected thereto.

6. The transmission according to claim 1, wherein said gearwheels in mesh with said large wheel include an input gearwheel that can be connected for conjoint rotation to said shaft being an input shaft and a first output gearwheel in mesh with said large wheel, together with said shaft being an output shaft or an intermediate wheel, wherein said at least two partial housing units can be connected by means of said main joint extending through support regions of at least one of said output gearwheel, said input gearwheel or said intermediate wheel or of said shafts connected thereto.

7. The transmission according to claim 1, wherein said main joint is configured to extend through said support region of said large wheel or of a large-wheel shaft connected to said large wheel.

8. The transmission according to claim 1, wherein said joint provided between said central housing part and said side housing part of said second, upper partial housing unit is configured to extend at an angle in a range of from 39° to 150° to said main joint.

9. The transmission according to claim 1, wherein said joint provided between said central housing part and said side housing part of said second, upper partial housing unit is disposed outside said support region of an individual one of said gearwheels supported in said main joint.

10. The transmission according to claim 9, wherein said joint provided between said central housing part and said side housing part of said second, upper partial housing unit is disposed outside said support region of said large wheel or of a large-wheel shaft connected to said large wheel and within a region of extent, starting from a axis of rotation of said large wheel, when viewed along said main joint, which corresponds to a region of extent of a tip diameter of said large wheel.

11. The transmission according to claim 1, wherein said main joint is configured to extend in one plane or in a stepped manner.

12. The transmission according to claim 1, wherein at least two of said gearwheels supported in said main joint or of said shafts connected thereto have axes of rotation disposed in a common plane of arrangement or in different planes of arrangement.

13. The transmission according to claim 1, further comprising:
 a further shaft; and
 at least one further gearwheel, which is connected to said further shaft that can be connected to a further input and/or output unit or is embodied integrally with said further shaft and is in mesh at least indirectly with said large wheel as well as being supported outside said main joint in said first partial housing unit, wherein said further gearwheel with said further shaft is a stub shaft pinion.

14. The transmission according to claim 1,
 further comprising a further joint;
 wherein said housing has a third partial housing unit connected by means of a further joint to said central housing part; and
 wherein at least one of said gearwheels, which is connected to said shaft that can be connected to the input and/or output unit or is embodied integrally with said shaft, which is in mesh with said large wheel and which is accommodated by said third partial housing unit.

15. The transmission according to claim 14, wherein said first partial housing unit is a transmission housing bottom part and said second, upper partial housing unit is an upper transmission housing part, and said third partial housing unit is an additional transmission housing cover closing off said upper transmission housing part or a partial housing unit which at least partially accommodates at least one of said gearwheels.

16. The transmission according to claim 1, wherein at least one of the following apply:
 said side housing parts are connected to said central housing part;
 said side housing parts and said central housing part are connected to said first partial housing unit; and
 said two partial housing units are connected by means of at least one connection selected from the group consisting of form-locking connections, fastening elements and force locking connections.

17. A transmission turbomachine, comprising:
input and/or output units; and
a transmission, containing:
 a large wheel;
 at least two gearwheels being in mesh at least indirectly with said large wheel and are each connected to or formed integrally with a shaft connected to said input and/or output units;
 a housing in which said gearwheels or said shafts connected thereto are supported, said housing having at least two partial housing units including a first partial housing unit, which is at a bottom in an installation position, and a second, upper partial housing unit, which is disposed offset vertically with respect to said first partial housing unit in the installation position, said two partial housing units being connected by means of a main joint extending through a support region of at least one of said gearwheels in mesh at least indirectly with said large wheel or of said shaft connected to said one gearwheel; and
 said second, upper partial housing unit is formed from at least three housing parts including a central housing part, which accommodates at least part of said large wheel, and two side housing parts, which are connected to said central housing part, said central housing part is in each case connected to one of said side housing parts by means of a joint aligned at an angle to said main joint.

18. The transmission turbomachine according to claim 17, wherein said input and/or output units connected to at least one of said shafts being input and/or output shafts is an element selected from the group consisting of:
 a rotor of a compressor stage; and
 a rotor of an expander stage.

19. The transmission turbomachine according to claim 17, wherein said input and/or output units coupled to one of said gearwheels being an input gearwheel is a machine selected from the group consisting of:
 a turbo engine;
 a turbine;
 an electric drive motor; and
 an internal combustion engine.

20. A method for assembling a transmission turbomachine, which comprises the steps of:
 providing a housing which contains at least two partial housing units, including a first partial housing unit and a second partial housing unit, which is connected by means of a main joint that extends through support regions of gearwheels to be supported in the housing or of shafts connected thereto, wherein one of the partial housing units to be connected is formed from at least three housing parts including a central housing part and two side housing parts, wherein the central housing part can be connected to one of said side housing parts in each case by means of a further joint aligned at an angle to the main joint;
 installing and/or positioning of the first partial housing unit, which is at a bottom in an installation position and is of an integral design;

installing a large wheel and a gearwheel in mesh with the large wheel in/on the first partial housing unit, in the main joint of the first partial housing unit;

installing the central housing part so as to at least partially surround the large wheel, and connection to the first partial housing unit at the main joint;

installing the gearwheels in mesh with the large wheel and supported in the main joint; and installing the side housing parts, involving connection to the central housing part and to the first partial housing unit to form the second partial housing unit connected to the first partial housing unit.

21. The method for assembling a transmission turbomachine according to claim 20, which further comprises configuring the transmission turbomachine as a transmission compressor, and individual output units are embodied as compressors, wherein rotors of the compressors are installed with the individual output shafts and, after installation of a rear wall on the first partial housing unit, the compressor housings are installed thereon.

22. The method for assembling a transmission turbomachine according to claim 21, which further comprises using the large wheel to drive an additional compressor stage, which is supported in the central housing part and in a third partial housing, wherein the additional compressor stage is formed after installation of the second partial housing unit.

* * * * *